July 22, 1952  C. F. WALLACE  2,603,973
FLEXIBLE CHAMBER PRESSURE GAUGE
Filed March 15, 1947  2 SHEETS—SHEET 1

INVENTOR.
Charles F. Wallace
BY
Robert S. Dunham
ATTORNEY

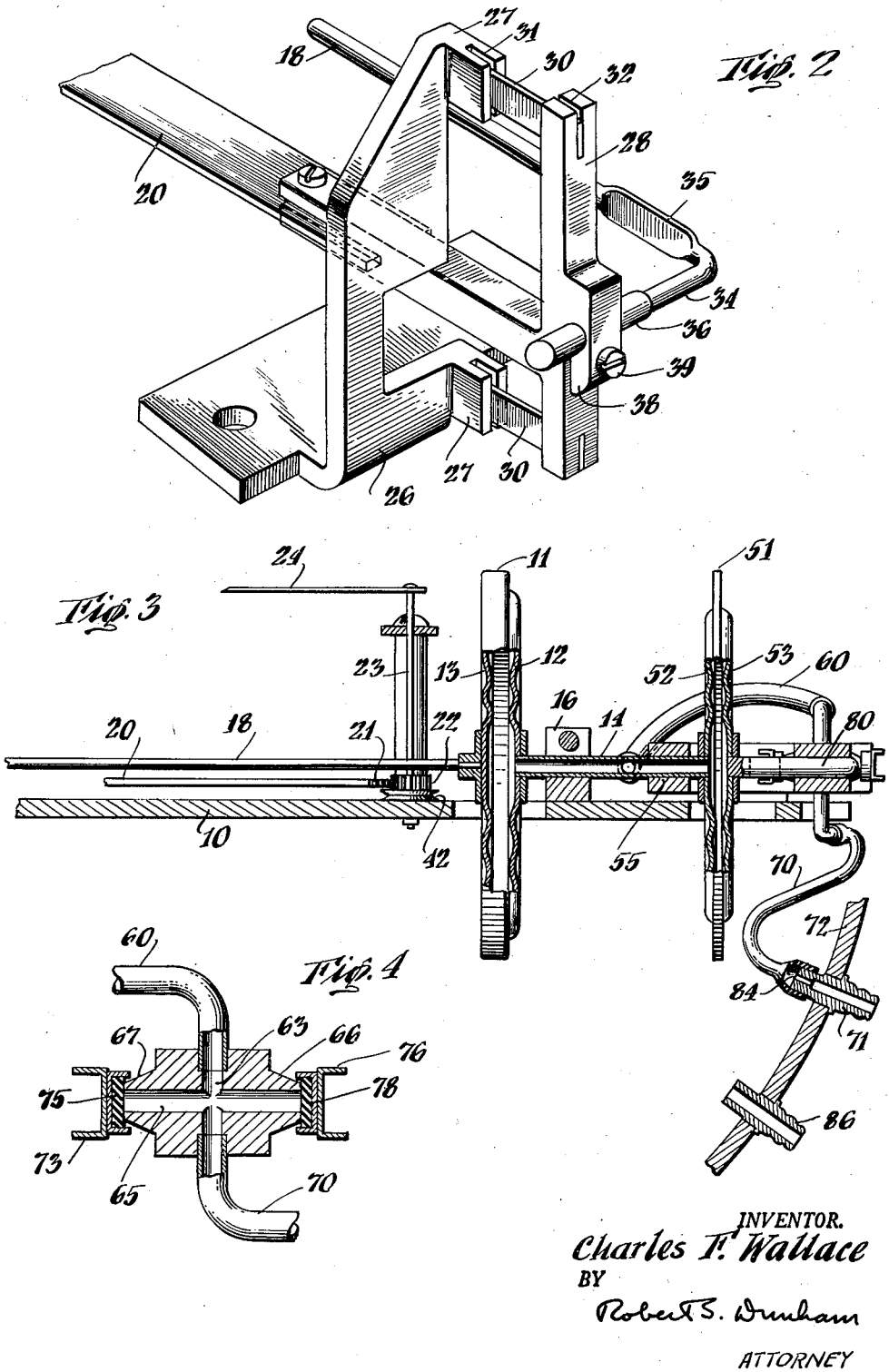

Patented July 22, 1952

2,603,973

UNITED STATES PATENT OFFICE 2,603,973

FLEXIBLE CHAMBER PRESSURE GAUGE

Charles F. Wallace, Westfield, N. J., assignor to Wallace & Tiernan Products, Inc., Belleville, N. J., a corporation of New Jersey Application March 15, 1947, Serial No. 734,983

15 Claims. (Cl. 73—389)

This invention relates to pressure-sensitive instruments of the flexible chamber type, i. e. embodying a box or capsule having a flexible or flexibly supported face or a plurality of such faces adapted to be displaced in accordance with changes in the difference of fluid pressure between the interior and exterior of the chamber. So-called aneroid barometers wherein the flexible box is completely sealed are a common example of such instruments, but the invention is also and especially applicable to other devices employing a similar pressure-sensitive element, as where a conduit is connected to the interior of the box for communication with a source of pressure to be measured, the actual detection involving, of course, a response to changes in the amount by which the pressure inside the box differs from that outside.

For instance if the device is enclosed in a sealed case, the conduit for the interior of the flexible box may be accompanied by one leading simply to the interior of the case; either conduit may be open to the atmosphere and the other connected to a source of different pressure, which may be higher or lower than atmospheric, or the other conduit can merely be closed (for use of the device as a barometer or altimeter); or the conduits may be extended to localities otherwise exhibiting a significant pressure difference, for example across a resistance in a fluid flow line. It will also be understood that whereas these instruments are often employed for simple indication, as by actuating a pointer or needle that swings across an appropriate scale, they may be used to actuate other translating means, e. g. for recording, control, telemetering or other purposes, and indeed in any situation demanding translation of pressure values or changes.

An important object of the invention is to provide more reliable and rugged instruments of the character described, which are less susceptible of breakage or derangement and yet which are fully sensitive and accurate in their intended response. Another object is the provision of improved and easily adjusted movements and appurtenances in such devices, that are relatively inexpensive and that provide a new measure of safety against abnormal conditions that might otherwise constitute damaging abuse.

A specific further object is to afford automatic protection from effects of excess or extraordinary pressure conditions that might injure the pressure-sensitive element or the mechanism actuated by it.

Another specific object is to provide a sturdy and positively responsive movement, particularly for devices wherein the ultimate translating means is operated by gearing or the like, such that shock, vibration, operations for adjustment, or similar conditions of use are much less likely to unmesh or otherwise derange the displacement-transmitting mechanism; and another object is to permit simple and more convenient adjustment, as for calibration to match the range of operation of the pressure-sensitive means with a scale intended for it.

For these and other objects, both general to the improvement of such instruments and specifically incidental to the use and operation of devices such as disclosed, the following description of an embodiment of the invention as depicted in the accompanying drawings will serve by way of example to illustrate the nature and principles of the present improvements.

Referring to the drawings:

Fig. 2 is a very greatly enlarged perspective view of mechanical instrumentalities at the lower end of Fig. 1;

Fig. 3 is a fragmentary vertical section on line 3—3 of Fig. 1; and

Fig. 4 is a considerably enlarged, fragmentary vertical section on line 4—4 of Fig. 1.

Figure 1:
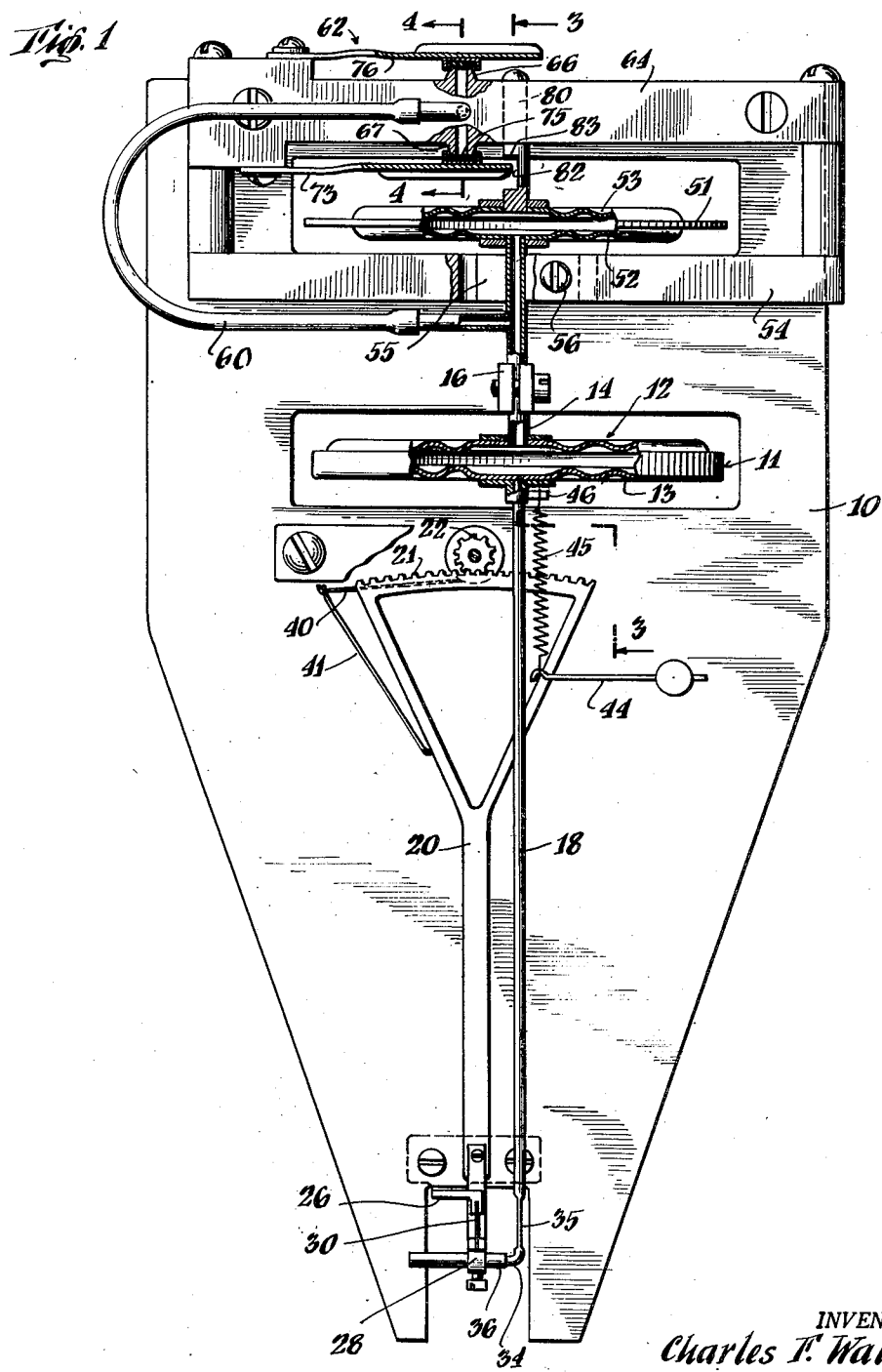
Fig. 1 is a plan view of one form of an instrument movement embodying the invention, with some portions broken away in horizontal section.

The illustrated instrument is mounted on a base 10 and has a pressure sensitive element comprising the sealed box or capsule 11, which may be of any appropriate form, for instance having a pair of generally parallel faces 12, 13 made of resilient material such as Phosphor bronze or beryllium copper, and annularly corrugated, the whole being arranged so that changes of the pressure difference between the interior and the exterior of the box effect corresponding mutual displacement of the walls 12, 13, especially at their mid points. From the wall 12 a conduit 14 projects, being secured to the wall and affording communication of gas pressure to the interior of the box. The conduit is held by a clamp 16 which is fastened to the base 10, so that a fixed support is thus constituted for the box and particularly for the center of its face 12.

The present instrument is of a type providing for angular displacement of a member which operates means transmitting such displacement, for example a segment gear meshing with a pinion on the pointer shaft, as more particularly explained hereinbelow. In contrast to prior arrangements wherein, for example, the segment gear has been fixed at the end of a straight lever pivoted by a flexible, resilient strip secured perpendicularly thereto, and directly actuated by like connection from the sealed box or bellows, presently preferred examples of this invention comprise a more secure fulcrum arrangement for the lever, positively holding the latter against undesirable lengthwise displacement and yet affording fully as great sensitivity and accuracy as the previous types of construction.

To be displaced axially by the bellows, a rod 18 is secured to, and projects perpendicularly from, the center of the face 13. A cooperating lever member 20 is disposed along a line substantially parallel with the rod 18 and carries at one end a gear segment 21 in mesh with a pinion 22 on the upright pointer shaft 23, so that as the lever is rocked about its fulcrum, described below, the segment 21 turns the pointer shaft 23 and displaces the pointer 24 angularly with respect to its scale (not shown).

Appropriately remote from the gear segment 21 the lever 20 is provided with a fulcrum support shown best in Fig. 2. This structure includes an upstanding bracket 26 secured to the base 10 and having a pair of vertically spaced lugs 27 disposed generally in alignment with the lever 20. The latter carries a vertical cross member 28 arranged so that its upper and lower ends face the lugs 27, and the cross member and lugs are respectively connected by a pair of flexible hinges 30. Although other pivot structure may be employed, an arrangement of the flexible or resilient type is particularly preferable, as avoiding both backlash and unnecessary friction, and in the example shown the hinge strips 30 may comprise leaf springs of Phosphor bronze, beryllium copper or the like, each secured at its opposite ends in corresponding slots 31, 32 of the lug 27 and cross member 28 respectively. Thus fastened in the slots 31, 32 as by soldering, the hinges 30 provide means aligned with the lever member, flexibly mounting the latter for angular displacement about the vertical pivot line.

The rod 18 extends to a locality adjacent the fulcrum structure and is connected to the lever 20 by a transverse arm 34 secured to the lever and pivotally mounted on the rod. As in the case of the fulcrum, a flexible pivot connection is greatly preferred, and in the illustrated device the arm 34 comprises, in effect, a portion of the rod extending laterally therefrom and mounted by a flexible portion 35 which is aligned with the main body of the rod and which may be made, for instance, by flattening a suitable part of the rod to a thin configuration affording the desired, free resilience. For more effective mounting at the end of the lever 20 the arm 34 may have an enlarged portion 36 as shown. Although in some cases the arm may be permanently fixed to the lever member, a particularly desirable arrangement is such as to provide adjustability of the length of connection between the lever and the rod. Thus the arm portion 36 is secured in a suitable clamp 38 on the cross member 28, which may be released and tightened by a clamping screw 39 traversing the outer part of the clamp and threaded into the main body of the cross member.

Appropriate supplemental means may be included for improving the reliability and adjustability of the instrument. For example, one such means, for preventing backlash in the gearing 21, 22, as described and claimed in my copending application Serial No. 517,411, filed January 7, 1944, now Patent No. 2,431,098, comprises a filament 40 secured at one end to a spring 41 on the gear segment and at the other end to a drum 42 on the pointer shaft, the filament being wrapped around the drum so that a constant tension is applied to the teeth of the segment 21 relative to the pinion 22, regardless of the mutual position of these members. A further supplemental means, for adjusting the tension of the bellows 11, includes an angularly adjustable arm 44 carrying one end of a spring 45 extending under tension to an appropriate pin 46 at the face of the bellows.

It will be seen that as the face 13 of the box or bellows moves relative to the face 12, by reason of pressure changes, the rod 18 is displaced axially, and through its linkage to the arm 34, flexibly extending from the rod as described, the lever member 20 is swung about its vertical fulcrum. Thus the axial displacements of the rod are translated into rocking displacements of the lever member, moving the teeth of the gear segment 21 and appropriately turning the pinion 22 on the indicator shaft. Particular advantages of the described arrangement are not only its positive transmission of movement from the bellows 11 to the gear segment 21 but also a remarkable avoidance of any tendency to disarrangement of the lever 20 and especially toward loosening or unmeshing of the gears 21, 22. In prior arrangements, such as mentioned hereinabove, difficulty has sometimes been encountered in keeping the gears in mesh, particularly when the instrument was subjected to shock or vibration or to sudden changes of pressure or when attempt was made to effect positional adjustment of certain parts, i. e., under circumstances having the possible effect of moving a gear-carrying member transversely of the path of its teeth. The present structure, by virtue of the transversely linked push rod arrangement and particularly by virtue of the alignment of the resilient strips 30 with the lever (or with the locality of mesh of the gears), provides a secure and positive mounting for the lever such that longitudinal displacement is practically impossible regardless of the nature or extent of movement of the rod 18.

In consequence, the gearing or like connection 21, 22 is kept positively in mesh at all times; the lever member 20 is firmly held against longitudinal movement by the fulcrum supporting structure. At the same time the arrangement of the push rod 18 and the connecting arm 34 effectively transmits the displacements of the bellows to the lever member, the distance between the flexible connection at the end of the rod, and the fulcrum of the lever being sufficiently short to afford the desired mechanical amplification. Although it will now be apparent that in some cases a variety of reversed and other arrangements of the respective ends of the rod and lever may be employed (while maintaining one or both of the advantageous effects of a flexible hinge structure aligned with the lever, and of a push rod operating along a path generally parallel to the normal position of the lever), the illustrated structure is peculiarly satisfactory, e. g. for the sake of compactness and in permitting disposition of the pointer shaft at a central location. Thus, as shown, the push rod 18 is preferably elongated so as to terminate near the outer end of the lever, which in turn carries its gear segment 21 at a place relatively near the bellows with the fulcrum structure 26—30 at a locality remote from the pressure sensitive element.

Likewise the exact connection of the cross arm 34 to the lever member may differ in other cases, although it is desirable to have it arranged at the outer end of the lever member, especially for convenience in making the described adjustment; and for effective amplification the connection should be at least relatively close to the fulcrum. Furthermore, with the connection of the rod to the cross arm remote from the box 11, e. g. as shown, any small lateral movement of the rod at such outer point, incidental to ordinary operation or adjustment, has no appreciable tendency to rock the face 13; the desired axial character of rod displacement by the bellows is thus maintained, in effect, throughout the range of use of the instrument.

By adjusting the position of the arm 34 in the cross member 28 of the lever, calibrative adjustment is readily achieved of the rate of displacement of the gear segment 21 relative to that of the bellows face 13. In effect, the adjustment changes the ratio of the arms of the lever, so that the range of response of the pointer, for example in angular extent where the latter is arranged to swing about an axis as shown, may be changed relative to the actual range of movement of the walls of the pressure-sensitive box. Thus any of a considerable variety of scales, e. g. expanded to cover only a small actual range of pressure values or contracted to cover a wide range, may be accurately matched to such part or all of the range of displacement of the rod, as may be appropriate.

It will be appreciated that whereas the lever 20 is not precisely aligned with its flexible hinge structure nor precisely parallel with the rod 18 at extremities of its swing, the maximum departure in such respects is not great and the function of the described instrumentalities, particularly in affording positive support for the lever 20, remains essentially the same through all positions. In consequence the relations may be properly defined as involving substantial alignment and parallelism, respectively.

A further feature of particular importance in the present instrument comprises means associated with the bellows and other described parts, to prevent damage upon the occurrence of abnormal pressure conditions. Thus there is provided another flexible box or bellows 51 having mutually displaceable faces 52 and 53 and communicating with the conduit 14 that leads to the interior of the box 11. In the simple and effective arrangement shown, for instance, the conduit 14 comprises a length of rigid tubing secured at its further end in the face 52 of the box 51, and further clamped, for support of the box 51, in a cross bar 54 having a horizontal slot 55 that has an enlarged part to receive the tube 14. The portions of the member 54 separated by the slot are tightened together by means such as the screw 56 and the structure 54 is suitably secured to the base 10.

From the tube 14 a further conduit 60 extends, eventually for communication with a source of pressure to be measured by the instrumentalities under control of the bellows 11. The conduit or tube 60, however, traverses a valve arrangement generally designated 62 and comprising a vertical passage 63 (Fig. 4) in a transverse bar 64 carried by the base 10. The bar 64 also has a lateral or horizontal passage 65 intersecting the passage 63 and opening through appropriately projecting necks 66, 67 on the inner and outer sides of the bar, the passage 65 being aligned substantially perpendicularly to the face 52, 53 of the supplemental bellows 51. The tube 60 opens into one end, say the upper end, of the passage 65 and the lower or opposite end may communicate through a further conduit portion 70 to an appropriate nipple 71 in the wall 72 of the instrument housing, the latter being shown fragmentarily and in a diagrammatic manner in Fig. 3.

Each of the necks or openings 66, 67 constitutes in effect a valve seat for cooperation with appropriate closure devices. Thus a flat spring element 73 secured at one end to a shoulder on the bar 64 and carrying a closure disk 75 of appropriate elastic material, such as rubber, Koroseal, or the like, constitutes a closure device for the seat 67, and a similarly mounted spring element 76 carrying a like elastic closure disk 78 provides a corresponding closure device for the valve seat 66. The spring mounting of each closure device is such that the valves are firmly biased to closed position with the disks 75, 78 seated respectively on the necks 67, 66. At the same time, each of the closures may be separated from its valve seat by displacing it in a direction perpendicularly to the faces of the box 51, i. e. in respectively opposite directions.

A rod 80 secured in the face 53 of the box 51 projects perpendicularly therefrom and slides freely in a corresponding hole in the bar 64. The outer end of the spring closure member 76 projects across the path of the rod 80 as shown and the rod 80 also constitutes means for actuating the other closure 73, by virtue of an appropriate notch 82 in the rod so that the wall 83 of such notch, facing the bellows, is adapted to engage the end of the spring element 73 that projects partly into the notch. It will now be apparent, for example in reference to Fig. 1, that a relatively large expansion of the bellows 51 moves the rod 80 axially outward so that its remote end engages the valve element 76 and upon pushing the latter outwardly opens the valve 66—78. Likewise a sufficiently great contraction of the bellows moves the rod 80 inwardly along its axis bringing the face 83 of the notch into engagement with the member 73 and similarly opening the valve 75—67.

By virtue of the illustrated arrangement any abnormally large difference of pressure between the region outside of the two bellows 11, 51 and their communicating interiors will provide a correspondingly large axial displacement of the operating rod 80. If such pressure condition is occasioned by a much lower pressure within the bellows than outside, the rod 80 moves to actuate the valve element 73, and if the pressure difference is of the opposite sort, i. e. providing a much higher pressure in the bellows than externally thereof, the outer end of the rod moves the valve arm 76 to open position. In either case, the conduit structure 60—70 is effectively opened to the region surrounding the bellows, at once relieving the sensitive elements from further increase of such pressure difference, and specifically preventing further displacement of the walls of either bellows 11, 51 beyond that necessary to operate the valves in the described manner.

In other words, the described means provide a relief valve effective to short-circuit the pressure-sensitive box 11 (and likewise the box 51) upon the occurrence of excessive pressure change such as might, if allowed to progress, break the box or permanently distort it or damage the translating structure including the rod 18 and lever 20 actuated thereby. At the same time by virtue of the clearance between the valve closures and the working faces of the rod 80 the relief is only effective when the pressure departs from the predetermined limits, so that throughout its desired range the main bellows 11 operates in the intended manner for translation of pressure changes.

For maximum safety and certainty of effectiveness, the described instrumentalities should permit relief of the pressure difference in such a way that even though conditions in or relative to the remote end of the conduit 70 tend to increase the pressure difference, it cannot build up, so to speak, in either elastic box faster than it is relieved. To that end the conduit structure, preferably at a point therein on the other side of the valves from the boxes, may include at least a portion having a resistance to fluid flow greater than is presented by the actual opening of either valve when the displacement of the corresponding valve closure element is carried no further than can be achieved within a limit of complete safety for the boxes. For example a region 84 of reduced internal diameter can be provided at the inner end of the nipple 71, i. e. in effect in the conduit 70. Under such circumstances and assuming that the valve openings 66, 67 are substantially larger in cross-section than the portion 84, any increasing abnormality of pressure in the conduit 70—60 cannot be communicated to the interior of the bellows faster than it is relieved or in effect short-circuited by opening one of the valves.

In this manner, positive and fully effective provision is achieved for the safety of the entire instrument against excessive pressure conditions. Although in some cases where excess of only one sort, either high or low, is anticipated, a corresponding single one of the valves 66, 67 with appropriate operating means actuated by bellows 51 may suffice; but for the sake of safety and especially for the universal applicability of a given instrument to a variety of types of uses, provision of both high and low relief valve structures, operable in common by the single supplemental bellows 51, is greatly preferred. The inclusion of the supplemental box 51 for actuation of the valve devices provides a peculiarly effective combination, not only in avoiding disturbance of calibration of the main device when the safety relief is brought into play but also in permitting such selection of design of the supplemental box as may enhance its valve-actuating function (e. g. either a particularly powerful characteristic of movement or a relatively large displacement upon a given pressure change) and as might not represent the optimum of both sensitivity and reproducibility for a pressure-measuring device.

As indicated above, the apparatus may be embodied in various forms and the illustrated structure including provision for connection through the nipple 71 to an external source of pressure (either above or below atmospheric) has been chosen purely by way of example. Such an instrument will ordinarily have a case 72 (of which a fragment is shown in section, Fig. 3), and if the case is sealed it may have a passage provided with another nipple 86. The latter can be left open, for measurement of pressure in the conduit 70 relative to the atmosphere, or the instrument can, for instance, be used to measure the difference of two non-atmospheric pressures simply by the corresponding necessary connections to both of the nipples 71 and 86. Unless otherwise specifically apparent, references herein to pressure change in a bellows or conduit or to a departure of the pressure in such enclosures from a predetermined limit, include change or departure of the pressure difference between the interior and exterior of the enclosed space, and thus contemplate and include situations when, for example, the dangerous condition that should prompt the operation of the relief valve occurs by sudden and large change in the absolute pressure outside the bellows. It will also be appreciated that the term "bellows" has been herein employed, purely for convenience of expression, to mean generically a flexible or elastic box or capsule of the general sort described, i. e. having one or more resilient or resiliently mounted walls movable in accordance with pressure changes.

If desired, moreover, the tube 14 and correspondingly the two bellows may have a single mounting means, such as the clamp 16, thereby dispensing with the further clamping structure 54—56. Supported as shown (or as just described), the center portions of the bellows walls 12, 52 are secured in fixed relation to the base 10, and the useful movement, for example, of the wall 13 actually represents in effect the mutual displacement of both walls of the bellows 11, which is entirely free at its periphery, the same being correspondingly true of the movement of the wall 53 of the other bellows 51.

By reason of the several cooperating features and combinations thereof as described, the present instrument constitutes a remarkably rugged and reliable device, proof against damage by abnormal conditions of pressure or handling, and yet amply sensitive in its translation of pressure changes for any desired purpose.

This application is a continuation-in-part of my copending application Serial No. 517,180, filed January 6, 1944, upon which United States Patent No. 2,455,200 was granted November 30, 1948, for Liquid Level Indicator.

It is to be understood that the invention is not limited to the specific embodiments herein shown or described but may be carried out in other ways without departure from its spirit as defined by the following claims.

I claim:

1. In apparatus for the character described, in combination, a pair of pressure-sensitive bellows, a rigid conduit connecting said bellows and rigidly secured to a face of each, supporting structure, means fastening said conduit to the supporting structure for support of both bellows so that their other faces are adapted to move independently in accordance with the pressure communicated to the conduit, each of said bellows having a rod secured substantially perpendicularly to its said other face, a lever extending alongside one of said rods, means carried on the supporting structure and including a resilient connection fastened to said lever and substantially immovable lengthwise of the lever, to provide a fulcrum for the lever spaced from the bellows, said last mentioned rod including a transverse portion secured to the lever in the vicinity of the fulcrum, and said rod including a flexible portion, whereby axial displacement of the rod rocks the lever about its fulcrum, gear structure on the inner end of the lever, a gear in mesh with said gear structure to be moved when the lever is rocked, a second conduit opening into the first conduit and having a passage opening to the atmosphere, and a valve normally closing said passage, and including a member shiftable to open the valve and disposed adjacent the rod of the other bellows, said last mentioned rod comprising means engageable with the member for shifting the latter upon displacement of the rod beyond a predetermined positional limit.

2. In apparatus of the character described, in combination, a pair of pressure-sensitive bellows, conduit means communicating with both bellows and extending for communication with a source of pressure that may differ from the pressure outside the bellows, said conduit means having a passage opening to the region outside the bellows, a relief valve normally closing said passage and operable to open the same, pressure-registering means controlled by one bellows, and means controlled by the other bellows for operating the relief valve upon departure of the pressure condition in the bellows from a predetermined limit, said last mentioned means comprising a member connected to said other bellows and movable thereby along a predetermined path, said valve having a part normally disposed at a predetermined locality in said path and shiftable in one direction from said locality by said member to open said valve, said member being free to move along said path through a distance in the other direction from said locality to permit a range of displacement of said other bellows corresponding to a pressure range which is bounded by said limit.

3. In apparatus of the character described, in combination, pressure-responsive translating means comprising a pressure-sensitive bellows, a conduit for connecting the interior of the bellows with a source of pressure that may differ from the pressure outside the bellows, said conduit having passage structure opening to the region outside the bellows, relief valve means normally closing said passage structure and adapted to be operated to provide communication between the interior of the conduit and the region outside the bellows, and means including another pressure-sensitive bellows communicating with said conduit for operating said valve means upon departure of the pressure condition of the conduit from a predetermined range, said valve operating means including a device movable by said second mentioned bellows from one predetermined position to another predetermined position through an intervening distance corresponding to said predetermined pressure range, and said valve means comprising a pair of elements respectively disposed at said predetermined positions and each there shiftable by said device, for opening the passage structure respectively at the upper and lower limits of said pressure range.

4. In apparatus of the character described, in combination, a pair of pressure-sensitive bellows communicating with each other and each mounted for expansive and contractive displacement independently of the other, a translating instrumentality controlled by one bellows in accordance with displacements thereof and independently of displacements of the other bellows, and relief means including a valve and control means therefor displaceable by the other bellows in response to a predetermined abnormal condition of pressure difference between the interior and the exterior of said pair of communicating bellows, for operating said valve to relieve said abnormal condition said control means being displaceable only by said other bellows and thereby separately from displacements of the first bellows, said control means comprising lost motion means for connection between said other bellows and said valve, including an element movable by said other bellows through a predetermined path and arranged to operate said valve only at an end of said path.

5. In apparatus of the character described, in combination, a pressure-sensitive bellows, a conduit for connecting the interior of the bellows with a source of pressure that may differ from the pressure outside the bellows, a rod projecting from one face of the bellows to be displaced axially in accordance with pressure changes in the bellows, said conduit including structure providing a pair of oppositely facing openings aligned in a direction substantially parallel to said rod, and a closure member for each opening, each closure member comprising means biasing the same to closed position and said closure members being individually shiftable in respectively opposite directions to uncover the openings, and said rod comprising structure engageable with said members to shift them in said directions respectively upon displacement of the rod beyond the ends of a positional range.

6. In apparatus of the character described, in combination, a pressure-sensitive bellows, pressure-registering means controlled thereby, a conduit for connecting the interior of the bellows with a source of pressure that may differ from the pressure outside the bellows, a relief valve for the conduit comprising an aperture in the latter and a closure for the aperture, means including another pressure-sensitive bellows communicating with said conduit for opening said valve upon departure of the pressure condition in said second bellows from a predetermined limit, said conduit comprising, intermediate the valve and the said source of pressure, at least a portion having greater resistance to fluid flow than the aforesaid aperture of the valve.

7. In apparatus of the character described, in combination, a pair of pressure-sensitive bellows disposed with their faces parallel and in axial alignment, a rigid conduit axially connecting the opposed faces of the bellows, means rigidly mounting the conduit for support of both bellows thereby, each bellows having a rod projecting perpendicularly from its outer face, pressure-registering means controlled by one rod, a second conduit opening into the first and adapted to communicate with a source of pressure that may differ from the pressure outside the bellows, said conduit including means providing oppositely disposed openings in the conduit, closure members respectively associated with said openings and spring-biased in closed position, said members being disposed adjacent the rod of the other bellows and shiftable in respectively opposite directions to open position, and said last-mentioned rod being arranged to engage and shift said members respectively upon axial displacement of the rod beyond corresponding positional limits.

8. In apparatus of the character described, in combination, a pressure-sensitive bellows, a rod secured substantially perpendicularly to one face thereof, to be displaced axially in accordance with pressure changes in the bellows, a lever extending in a direction substantially parallel to the axis of the rod, a fulcrum for the lever at a locality remotely spaced from the bellows, said fulcrum comprising a stationary support and leaf spring means fastened between the lever and the support and extending in a direction lengthwise of the lever, and a transverse arm secured to the lever adjacent the fulcrum and having flexible means fastening the arm to the rod at a locality thereon likewise remotely spaced from the bellows, for translating axial displacement of the rod into angular displacement of the lever, said flexible means comprising a spring member extending in an axial direction relative to the rod and rigidly connected at its ends to the arm and rod respectively to provide a freely flexing rocking connection between the arm and rod.

9. In apparatus of the character described, in combination, a pressure-sensitive bellows, a rod extending from one face thereof to be displaced axially in accordance with pressure changes, a lever having a fulcrum and means spaced from the fulcrum for transmitting angular displacement of the lever, said lever intermediate said fulcrum and said last mentioned means being disposed along a line substantially parallel to said rod, and said lever including a transverse connection to the rod for translating axial displacement of the rod into angular displacement of the lever, said lever fulcrum comprising leaf spring means fastened to the lever and extending in a direction lengthwise of the lever, and said transverse connection to the rod comprising an arm extending rigidly and transversely from the lever, and leaf spring means fastened to the rod and the arm and extending in a direction lengthwise of the rod, for flexibly connecting the arm to the rod.

10. In apparatus of the character described, in combination, a pressure-sensitive bellows, a lever, leaf spring means fastened to one end of the lever and spaced transversely from the longitudinal axis of the lever, to provide a fulcrum for the lever, said leaf spring means extending from said end of the lever in a direction lengthwise thereof toward the other end, supporting means for the leaf spring means at a locality spaced from the first-mentioned end of the lever, said lever having means spaced from the fulcrum for transmitting angular displacement of the lever, and means connecting one face of said bellows to said lever at its first-mentioned end for translating displacement of said bellows face into angular displacement of the lever.

11. In apparatus of the character described, in combination, a pressure-sensitive bellows, a rod extending from one face thereof to be displaced axially in accordance with pressure changes, said rod extending to a locality remote from the bellows, a lever disposed along a line parallel to the rod, said lever extending between said locality and the bellows through a major part of the length of the rod and thereby having an end near the bellows, and said lever having pressure-registering means operated by said lever at said end, a support adjacent said locality and having flexible means fastened to the support and to the lever member, for mounting the lever to rock about the support, said flexible means being disposed to yield only transversely of the lever, to prevent longitudinal displacement of the latter, and a lateral arm secured to the lever member near the support and having flexible means fastening said arm to the rod at said locality, for translating axial displacement of the rod into angular displacement of the lever member.

12. In apparatus of the character described, in combination, a pressure-sensitive bellows, a lever, means including a resilient connection fastened to said lever and substantially immovable lengthwise of the latter, to provide a fulcrum therefor, and means displaceable substantially linearly by the bellows, for connecting the bellows to the lever, to rock the latter about its fulcrum in accordance with pressure changes, said first-mentioned means comprising a pair of leaf springs spaced transversely from the longitudinal axis of the lever on opposite sides of the lever and extending parallel to said axis, means rigidly extending from the lever and fastened to one end of each spring, and supporting means fastened to the other end of each spring.

13. In apparatus of the character described, in combination, a pressure-sensitive bellows, a long rod member extending from one face thereof to be displaced axially in accordance wtih pressure changes, a lever member disposed parallel to and alongside said rod member, a support remotely spaced from the bellows, means flexibly securing the lever member to the support to permit angular displacement of said member about the support, and a lateral arm flexibly mounted on the rod member in the vicinity of the support and rigidly mounted on the lever member, for translating axial displacement of the rod member into angular displacement of the lever member, one of said members having adjustable means for mounting the arm, to permit adjustment of the lateral distance between the lever member and the rod member.

14. The apparatus of claim 13, in which the lever member extends from the support to a locality near the bellows and at said locality carries a gear segment for transmitting angular displacement of the lever member, said apparatus also including a pinion in mesh with the gear segment, to be turned by the latter, and the flexible securing means comprising resilient means substantially immovable lengthwise of the lever member and fastened between the latter and the support.

15. The apparatus of claim 13 in which the flexible securing means comprises a leaf spring extending in a direction lengthwise of the lever member and secured at one end to the lever member and at the other end to the support.

CHARLES F. WALLACE.

REFERENCES CITED

The following references are of record in the file of this patent:

UNITED STATES PATENTS

| Number | Name | Date |
| --- | --- | --- |
| 1,001,810 | Brown | Aug. 29, 1911 |
| 1,340,399 | Ohlson | May 18, 1920 |
| 1,935,736 | Colvin et al. | Nov. 21, 1933 |
| 1,937,565 | Griffiths | Dec. 5, 1933 |
| 2,178,799 | Loen | Nov. 7, 1939 |
| 2,306,038 | Crew | Dec. 22, 1942 |
| 2,311,900 | Newell | Feb. 23, 1943 |
| 2,345,464 | De Giers | Mar. 28, 1944 |
| 2,365,573 | McGay | Dec. 19, 1944 |
| 2,455,200 | Wallace | Nov. 30, 1948 |

FOREIGN PATENTS

| Number | Country | Date |
| --- | --- | --- |
| 1,964 | Great Britain | Aug. 20, 1855 |
| 11,485 | Great Britain | June 2, 1899 |